J. L. WENTZ.
DEVICE FOR POSITIONING APPARATUS AND THE LIKE.
APPLICATION FILED JAN. 12, 1920.

1,376,125.

Patented Apr. 26, 1921.

Inventor
Jere L. Wentz
By his Attorney

UNITED STATES PATENT OFFICE.

JERE L. WENTZ, OF PASSAIC, NEW JERSEY, ASSIGNOR TO PORTABLE MACHINERY COMPANY, INC., OF CLIFTON, NEW JERSEY, A CORPORATION OF NEW JERSEY.

DEVICE FOR POSITIONING APPARATUS AND THE LIKE.

1,376,125.      Specification of Letters Patent.      Patented Apr. 26, 1921.

Application filed January 12, 1920. Serial No. 350,860.

*To all whom it may concern:*

Be it known that I, JERE L. WENTZ, a citizen of the United States, residing at the city of Passaic, in the county of Passaic and State of New Jersey, have invented certain new and useful Improvements in devices for Positioning Apparatus and the like, of which the following is a specification.

My invention relates to improvements in devices for elevating, lowering and adjustably positioning apparatus, vehicle bodies, machine parts and the like, and the object of my invention is to provide a simple and convenient means for the said purpose.

I accomplish this object by the device illustrated in the accompanying drawings, in which—

Similar characters refer to similar parts throughout the several views.

Figure 1:
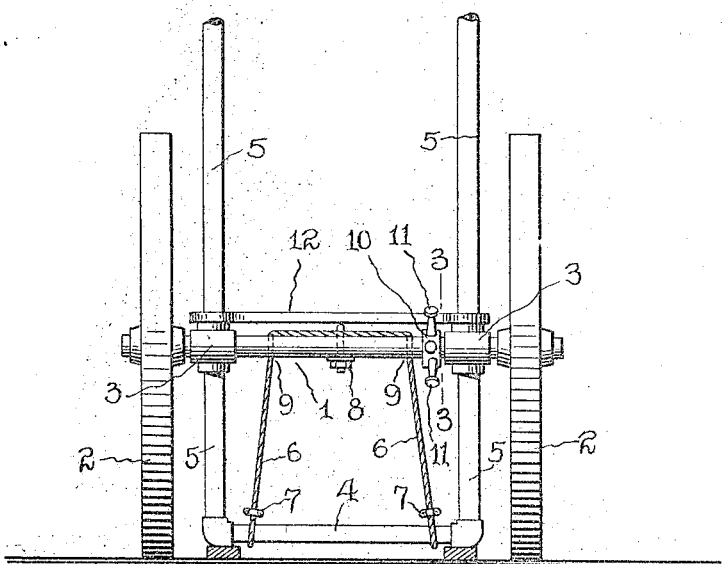
Figure 1 is an elevation of the device.
Figure 2:
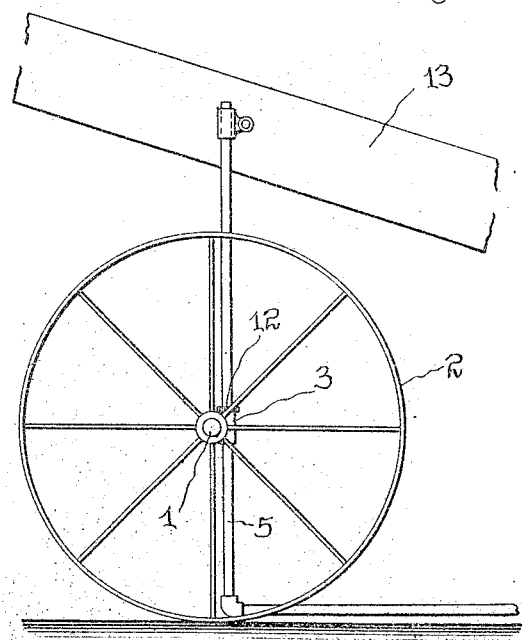
Fig. 2 is a detail of the same.
Figure 3:
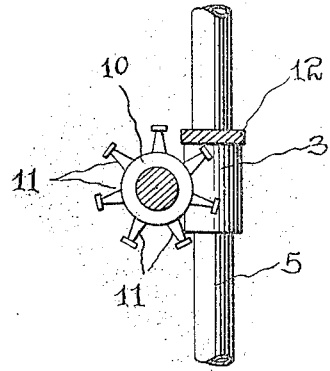
Fig. 3 is a section on the line 3—3 in Fig. 1.
Figure 4:
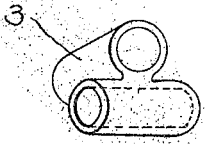
Fig. 4 is a view of the two way journal member.

In the drawings, I have shown the device applied to a wheeled vehicle in which an axle 1 is supported on traction wheels 2, 2. On the axle 1 adjacent the wheels 2, 2, I provide two way journal members 3, 3 each embracing the axle 1 and, at right angles thereto, one of the rods 5, 5 of a supporting frame which comprises a cross bar 4 and the two uprights 5, 5, forming a U-shaped structure.

A cable or chain 6 or other connecting medium is secured at its ends to the bar 4 or like part of the supporting frame by means of anchor clamps 7, 7 and is secured to the axle 1 or like rotatable part of the fixed structure by means of a clamp 8 or in any suitable manner. I prefer to thread the cable 6 through eyes 9, 9 in the axle 1, and to provide intermediate the eyes 9, 9 a U bolt 8 whereby the cable 6 may be locked and secured against displacement. On the axle 1, I provide a spider collar 10 having a plurality of projecting arms or teeth 11, 11. On the supporting rods 5, 5 I provide a yoke bar 12 which normally rests on the collars 3, 3 in the plane of rotation of the arms 11.

My device being thus assembled, the spider 10 is rotated by means of a pipe or lever of any desired form which may be placed upon an arm 11 of the spider 10. The yoke 12 is raised to release the arms 11 and the axle 1 is rotated thus winding up the cable 6 and raising the cross bar 4, with the supporting rods 5 and the structure 13 carried thereby, to the desired position when the yoke 12 is dropped into its normal position thereby locking the parts in the desired adjustment, and the weight of the supported structure will serve to retain the arm 11 in locked relation to the yoke 12. When it is desired to reposition the parts, an arm 11 of the spider 10 is engaged by a lever as above described, the arm 11 is released from its engagement with the yoke 12 and the axle 1 is rotated, winding or unwinding the cable 6 until the desired adjustment is attained, when the yoke 12 is restored to its normal position and the axle is thereby again locked by the engagement of the yoke 12 and one of the arms 11.

Having thus described my invention, what I claim is:

1. In a device of the character described the combination of a rotatable axle, traction wheels thereon, adjustable supporting rods secured to the axle, a connecting medium between the axle and the supporting rods, and means for winding the connecting medium on the axle to position the supporting rods.

2. In a device of the character described the combination of a supported structure, a U-shaped supporting member secured thereto, an axle, traction wheels thereon, a connecting medium secured to the U-shaped member and means for winding the said connecting medium on the axle to position the supported structure.

3. In a device of the character described a vertical U-shaped member, collars thereon, a rotatable axle journaled in said collars, a spider secured upon the axle, a plurality of peripheral teeth on the spider adapted to be engaged by a lever to rotate the axle and a connecting medium between the U-shaped member and the axle and adapted to be wound on the axle to adjustably position the U shaped member.

4. In a device of the character described, the combination of an axle, traction wheels mounted thereon, journal members on the axle, a supporting frame having uprights embraced by said journal members, a cable secured to said supporting frame and adapted to be wound on said axle to position the supporting frame and means for locking said axle.

In testimony whereof I affix my signature.

JERE L. WENTZ.